UNITED STATES PATENT OFFICE.

GERALD P. PLAISANCE, OF ST. LOUIS, MISSOURI, ASSIGNOR TO RALSTON PURINA COMPANY, OF ST. LOUIS, MISSOURI, A CORPORATION OF MISSOURI.

MEANS FOR PREVENTING FORMATION OF MOLD.

1,311,709.          Specification of Letters Patent.      Patented July 29, 1919.

No Drawing.      Application filed March 18, 1918.   Serial No. 223,065.

*To all whom it may concern:*

Be it known that I, GERALD P. PLAISANCE, a citizen of the United States, residing at the city of St. Louis, in the State of Missouri, have invented certain new and useful Improvements in Means for Preventing Formation of Mold, of which the following is a specification.

This invention consists of means for preventing the formation of what is known as mold in food and feed products and the like.

Mold is due to a fungous growth that develops in animal and vegetable matter in the presence of moisture. There are various kinds of fungi, indigenous to or at home in particular substances and differing in their attributes or specific qualities in a widely variant manner, but all classifiable under the generic name of mold.

The presence of mold in a food or feed product imparts to it a musty taste or flavor. In human food this is generally unpleasant to the taste and leads to the rejection of the moldy or musty article, although there are certain well-known exceptions. In animan feed, however, the presence of a taint of must or mold is very objectionable to stock or cattle and leads to their dissatisfaction with and rejection of the article thus tainted.

In feeds for stock and cattle it has become increasingly common to use ingredients like molasses. This is, however, an ingredient that readily tends to mold and to promote moldiness throughout the mass of feed with which it is mixed as an ingredient.

Under these circumstances, means that will not harm the food value of a product, but which will prevent the formation of mold or moldiness or the development of a musty taste is a desideratum, because, for one reason, it prevents the waste of large quantities of feed or food that are at present rendered valueless by mold and, for another reason, because it prevents dissatisfaction with a manufacturer's product that one of his ultimate customers naturally feels (whether or not it be the manufacturer's fault) when any quantity, and particularly when a large quantity, of feed or food becomes spoiled in this way.

It is undesirable that any chemical substance used for the purpose mentioned should have qualities detrimental to the health of men or animals or that would itself produce an unpleasant or disagreeable taste in the food or feed, and it is necessary, also, that any ingredient added to prevent mold shall in itself be of a non-harmful character.

I propose the use of the organic acids, such, for instance, as acetic, lactic, citric, and tartaric acids, to prevent mold. Acetic acid acts in the manner above indicated as a mold preventive and is not only unobjectionable but, in fact, advantageous, because it sharpens the appetite through its quality as a pickle and its taste. In other words, it is an appetizer as well as a means to prevent mold.

When molasses is added to feed, the article becomes a sweet feed, and, to a certain extent, animals are more or less likely to become cloyed with such sweet flavor, but this will not result when the vinegarish flavor of acetic acid is added to the feed.

Lactic acid can be used for the same purpose as acetic acid in the manner contemplated above, but at the present time cannot be purchased as cheaply.

In actual practice, samples of shelled corn containing approximately 25% moisture have been observed side by side, one sample having been treated with acetic acid and the other not so treated, with the result that the one not treated with acetic acid molded, while the one treated with acetic acid did not mold. The same practice has been observed in the case of an animal mixed feed containing molasses, and the result was no mold in the sample treated with acetic acid, while, on the other hand, mold strongly appeared in the quantity not treated with acetic acid.

The importance of this invention will be better realized when it is remembered that one of the difficulties connected with the more extensive use of Indian corn or maize for food is its tendency, when kept for a long time or transported through long distances or exposed to dampness, to spoil; and the quantity thereof, as well as of animal mixed feeds and certain human food products, that can be saved for proper consumption by preventing mold as herein described is very great.

While only acetic, lactic, citric, and tartaric acids have been herein mentioned as preventives of mold, it is not to be understood that this invention or the scope of the following claim is limited thereto, but similar preventives or acids of the same class are contemplated hereby as being within the spirit of this invention and the scope of the following claim.

It is, furthermore, to be understood that this invention includes poultry and pigeon and other feeds or foods, as well as human food and stock and dairy feed.

The above-recommended acid treatment, furthermore, prevents the growth or development of certain kinds of bacteria.

The proportion of acid used in the above-mentioned treatment ranges with the nature of the feed or food and the quantity of moisture present from about one-fourth of one per cent. to one per cent. of the entire mixture. The same should be thoroughly mixed with the food or feed.

I claim—

Solid, substantially dry, finely divided granular or pulverulent food material, having added thereto acetic acid in the proportion of approximately less than one per cent.

In testimony whereof I hereunto affix my signature.

GERALD P. PLAISANCE.